(12) United States Patent
Centmayer et al.

(10) Patent No.: US 7,735,196 B2
(45) Date of Patent: Jun. 15, 2010

(54) RETENTION HINGE CONNECTION FOR USE WITH AN EXTERIOR REAR VIEW MIRROR

(75) Inventors: Stefan Centmayer, Ergersheim (DE); Sebastian Heger, Bad Windsheim (DE); Werner Lang, Ergersheim (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 269 days.

(21) Appl. No.: 11/879,978

(22) Filed: Jul. 19, 2007

(65) Prior Publication Data

US 2008/0060165 A1 Mar. 13, 2008

(30) Foreign Application Priority Data

Aug. 9, 2006 (DE) .................. 10 2006 037 218

(51) Int. Cl.
*E05D 11/10* (2006.01)
(52) U.S. Cl. .................. 16/334; 16/330; 248/477; 248/479; 248/549; 359/841; 359/872
(58) Field of Classification Search .......... 16/334, 16/321, 330, 257, 259, 239, 229, 387; 248/476, 248/477, 478, 479, 549, 900; 359/841, 872, 359/877
See application file for complete search history.

(56) References Cited

U.S. PATENT DOCUMENTS

| 769,035 | A | * | 8/1904 | Walter ................. 16/330 |
| 1,429,416 | A | * | 9/1922 | Fade .................. 16/330 |
| 1,440,713 | A | * | 1/1923 | Ausbourne ............ 16/324 |
| 4,125,244 | A | * | 11/1978 | Lukey ............... 248/475.1 |
| 4,186,905 | A | * | 2/1980 | Brudy ............... 248/478 |
| 5,005,797 | A | * | 4/1991 | Maekawa et al. ...... 248/479 |
| 5,137,247 | A | | 8/1992 | Lang et al. |
| 5,317,785 | A | * | 6/1994 | Kobayashi ........... 16/329 |
| 5,881,150 | A | * | 3/1999 | Persson ............. 379/433.13 |
| 5,937,062 | A | * | 8/1999 | Sun et al. .......... 379/433.13 |
| 5,970,819 | A | * | 10/1999 | Katoh ............... 74/531 |
| 5,996,179 | A | * | 12/1999 | Huong .............. 16/330 |
| 6,012,201 | A | * | 1/2000 | Mitts et al. ........ 16/334 |
| 6,024,459 | A | * | 2/2000 | Lewis ............... 248/479 |
| 6,133,704 | A | * | 10/2000 | Yoshida et al. ...... 318/466 |
| 6,371,620 | B1 | * | 4/2002 | Lang et al. ......... 359/872 |
| 6,637,898 | B2 | * | 10/2003 | Hattori et al. ...... 359/841 |

(Continued)

FOREIGN PATENT DOCUMENTS

DE 27 26 740 1/1979

(Continued)

OTHER PUBLICATIONS

EU Search Report, Nov. 27, 2007.

Primary Examiner—Victor Batson
Assistant Examiner—Jeffrey O'Brien
(74) Attorney, Agent, or Firm—McNair Law Firm, P.A.; Seann P. Lahey (57) ABSTRACT

A retaining hinged connection, with a more simple assembly operation, having fewer components than does the conventional retaining hinges. An outside mirror is proposed to be engaged with such a retaining hinged connection. The connection is achieved in that the retaining axle component is designed with at least one retaining element and advantageously including a compression spring. This invention eliminates the use of bolts for securing the hinge assembly.

11 Claims, 6 Drawing Sheets

U.S. PATENT DOCUMENTS

| | | | |
|---|---|---|---|
| 6,665,906 B2 * | 12/2003 | Li | 16/330 |
| 6,859,978 B2 * | 3/2005 | Pan | 16/292 |
| 6,920,668 B2 * | 7/2005 | Hayashi | 16/303 |
| 7,052,148 B2 * | 5/2006 | Kuo | 359/841 |
| 7,096,536 B2 * | 8/2006 | Johnson | 16/330 |
| 7,399,137 B2 * | 7/2008 | Schuurmans | 403/95 |
| 7,490,945 B2 * | 2/2009 | Proctor | 359/841 |
| 2004/0108437 A1 * | 6/2004 | Schuurmans | 248/478 |

FOREIGN PATENT DOCUMENTS

| | | |
|---|---|---|
| EP | 0 527 455 B1 | 8/1992 |
| EP | 0527 455 A1 | 8/1992 |
| FR | 2 449 557 | 2/1980 |
| GB | 658 679 A | 10/1951 |
| GB | 2049586 | 12/1980 |

* cited by examiner

RETENTION HINGE CONNECTION FOR USE WITH AN EXTERIOR REAR VIEW MIRROR

CROSS REFERENCE TO RELATED APPLICATION

This application claims priority from German patent application number 102006037218.2, filed Aug. 9, 2006.

BACKGROUND OF THE INVENTION

The invention is directed to a retaining hinged connection primarily for use with an outside mirror for vehicles.

Position retaining and pivotal connections for supporting external mirrors on commercial vehicles have been installed in multiple embodiments. In the most simple arrangement, such a retaining pivotal support encompasses a first and a second adjustable arm, which terminate in identical retention elements. The retention elements possess circular holding bodies, which face one another and are brought into a mutual holding contact by means of, for example, a bolt, which penetrates the two holding bodies. The bolt may be enhanced by a spring to bring about a compressed, but adjustable fit. A disadvantage of this arrangement is that with consideration given to the design, insufficient flexibility of positioning exists. Moreover, such hinged connections are comparatively large and of considerable weight. The two retentive arms extend from one another at an angle of approximately 180°.

Additionally, retentive hinged supports for an external, rear vision mirror on a commercial vehicle are known, wherein the first holding arm is constructed as part of the framing of the mirror and is directly connected to the body of the vehicle. On this first holding arm is provided a first retention element, which extends in a horizontal direction. Onto this first holding arm is placed a second holding arm, which is tubular in construction. The two holding arms are then joined together by means of a bolt which extends essentially in a vertical direction. A joint is provided with a spring furnishing a compressive contact between the arm supports. The tubular holding arm protects at an approximate right angle to the vertical axis of the said bolt. This design is also characterized by a comparatively large demand of space and the necessity for a custom-made spring covering of the pivoting axle.

EP 0 527 455 B1 discloses a retention hinge for the support of an external rear view mirror on commercial vehicles. This retention hinge support is made of a first and a second support arm, which are pivotal about a swinging axis and can be rotated in relation to one another. The second arm support includes a bearing block, which is penetrated by a hinge axle component, which has a bolt and a helical, compression spring. The hinge axle component is secured by an upper and a lower opposed bearing components in the first support arm.

A retention element, which is penetrated by the bolt, includes a first and a second frictional or profiled holding surface. The first holding surface is rotationally affixed to the bearing block. The bolt holds together the assembled retention hinge.

The disadvantage of the hinged support as disclosed by EP 0 527 455 B1 is a comparatively complex construction.

SUMMARY OF THE INVENTION

Using EP 0 527 455 B1 as a starting point, it is the purpose of the present invention to provide a retaining hinged connection, which offers a simpler assembly or a construction having fewer components. In addition, this stated purpose also includes the proposal of an external mirror which uses such an improved hinged connection.

Inasmuch as a hinge axle component is made by at least one retention element operating in conjunction with one compression spring, the conventional bolt arrangement for holding the assembly together can be eliminated.

The mutually interacting retention surfaces extend themselves essentially radially to the retaining hinge axle component. In this way, the mutually associated holding surfaces are pressed together by means of the compression spring, to establish the desired retention function.

The advantageous embodiments of the invention present a simple arrangement of the bearing block, which has an upper and a lower exposed casing, whereby the at least one holding element extends itself, in the assembled condition, partially out of the casing and into the associated oppositely situated bearing block.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

The FIGS. 1-7 show various views of an exemplary embodiment of the retaining hinged connection in accord with the present invention. The retaining hinged connection possesses a first retaining arm 2 and a second retaining arm 4. On the first retaining arm 2, a mirror fastener 6 can be affixed, whereupon a mirror framing (not shown) with one or more mirror panes can be installed. The second retaining arm 4 can be installed on the vehicle by means of the indicated bolt borings 8.

Figure 5:
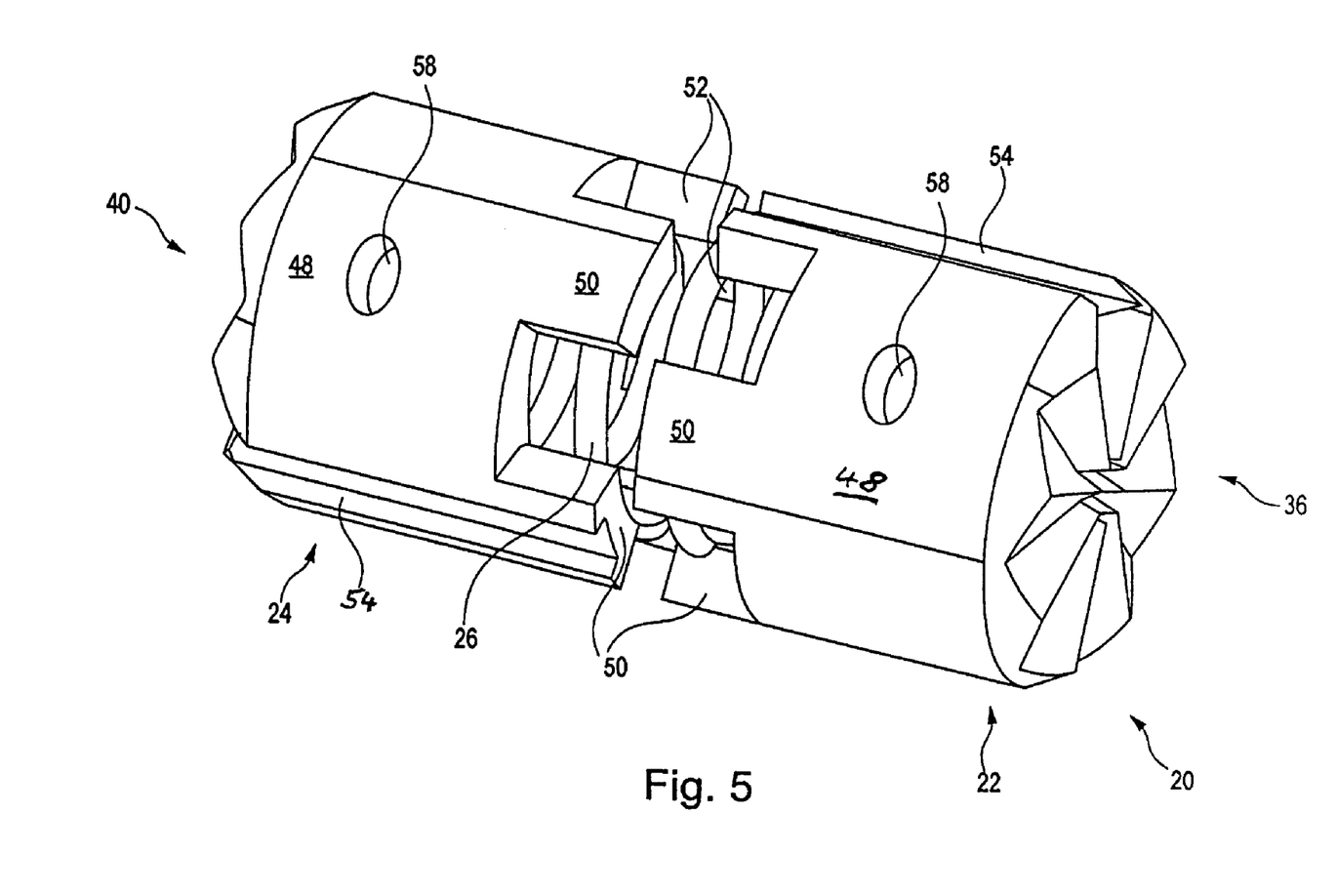
FIG. 5 is an exploded perspective view of the hinge axle component.

The two retaining arms 2 and 4 commonly rotate about one retaining hinge axis 10. The second retaining arm 4 includes a bearing block 12, which comprises casing 14 with an upper opening 16 and a lower opening 18. The bearing block 12, or more exactly, the casing 14 is penetrated by a hinge axle 20. The hinge axle 20 cylindrically encapsulates the retaining hinge axis 10. The hinge axle 20 possesses an upper retainer 22 and a lower retainer 24. Between the retention bodies is a helical, compression spring 26 with an upper end 28 and a lower end 29. FIG. 5 shows a detailed presentation of the hinge axle 20.

The first retaining arm 2 has a U-shaped recess on its end, proximal to the second retaining arm 4. The two legs forming the indicated U comprise upper and lower bearing housings 30 and 32. These two housings 30, 32 are generally pot-like or include inner concave surfaces with the openings therein facing one another. On the inner side and within the concave surface of the upper housing 30, is provided a first contoured retention surface 34. On the outer end face of the upper retainer 22 is found a second, contoured retention surface 36. Combined, the first and second retention surfaces 34, 36 form the first retaining element 38. Outward, on the end face of the lower retainer 24, is located the third contoured retention surface 40. On the inner side and within the concave surface of the lower bearing housing 32 is to be found a fourth retention surface indicated at 42 (not shown).

The said third retention surface 40 will match with the fourth complementary contoured retention surface 42 of the lower bearing housing 32. Contoured surface 42 is similar to contoured surface 34. As before, the third and the fourth contoured surfaces 40, 42, combine to establish a second retaining element 44. The two upper and lower bearing housings 30, 32 are seen as facing one another in FIG. 2. When in the assembled state, the described components fit together to make a functional unit. In this combination, the upper and lower openings 16 and 18 of the external casing 14 are filled.

Figure 1:
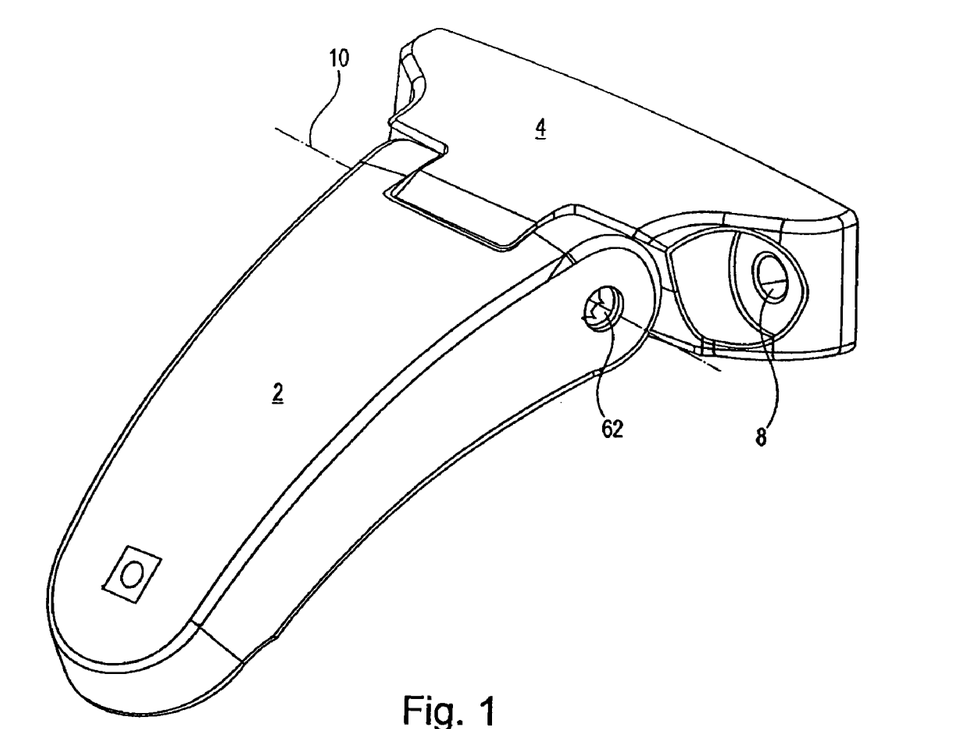
FIG. 1 is a perspective view of an embodiment of the invention.
Figure 2:
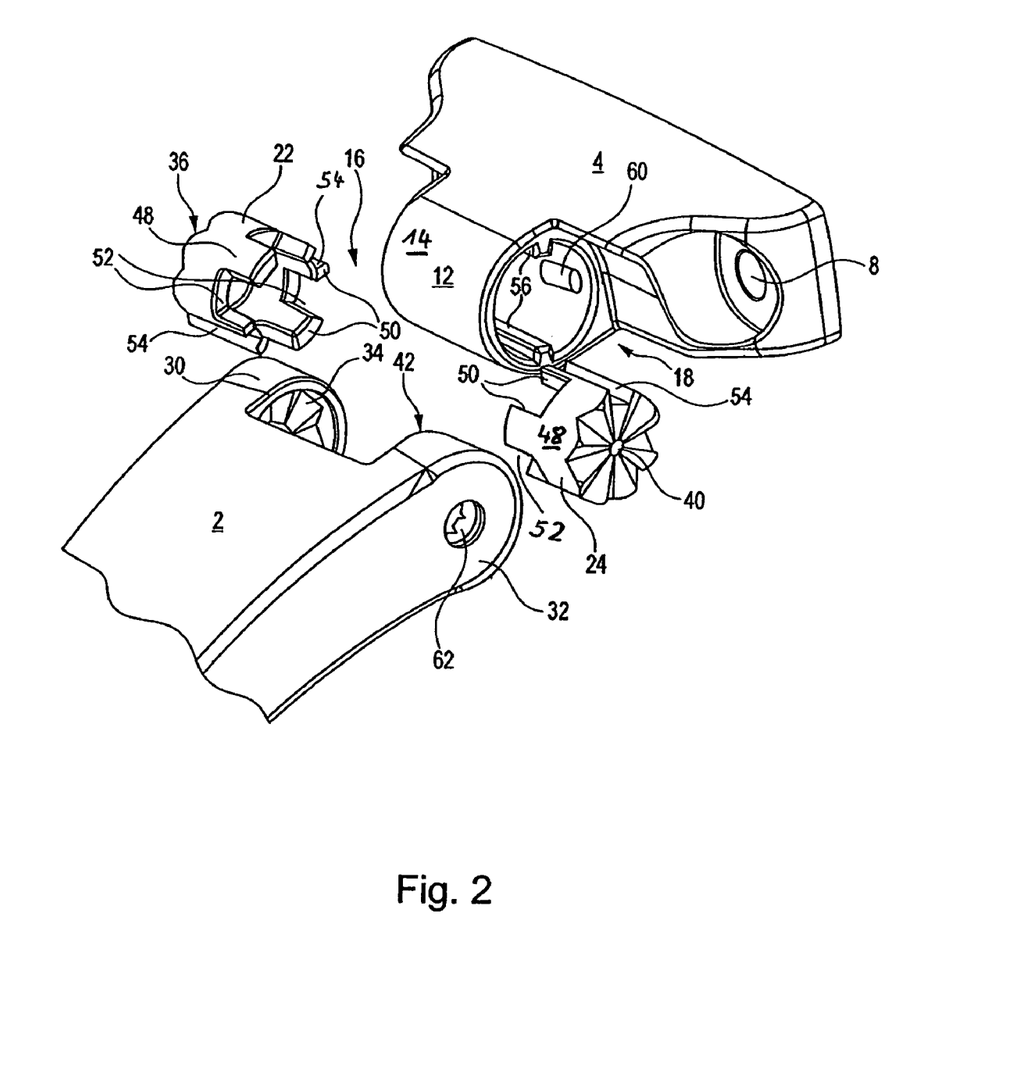
FIG. 2 is an explosion view of the arrangement shown in FIG. 1.
Figure 3:
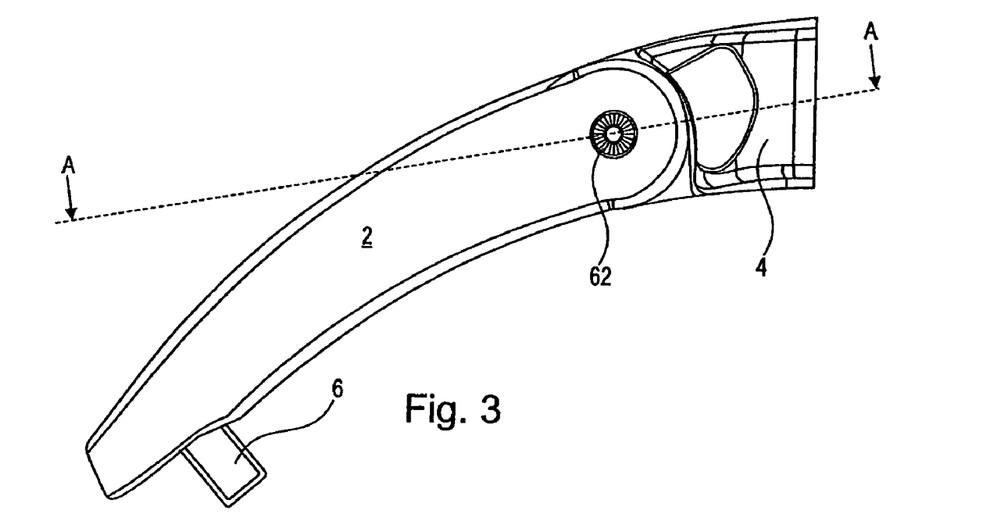
FIG. 3 is a top view of the arrangement shown in FIG. 1.
Figure 4:
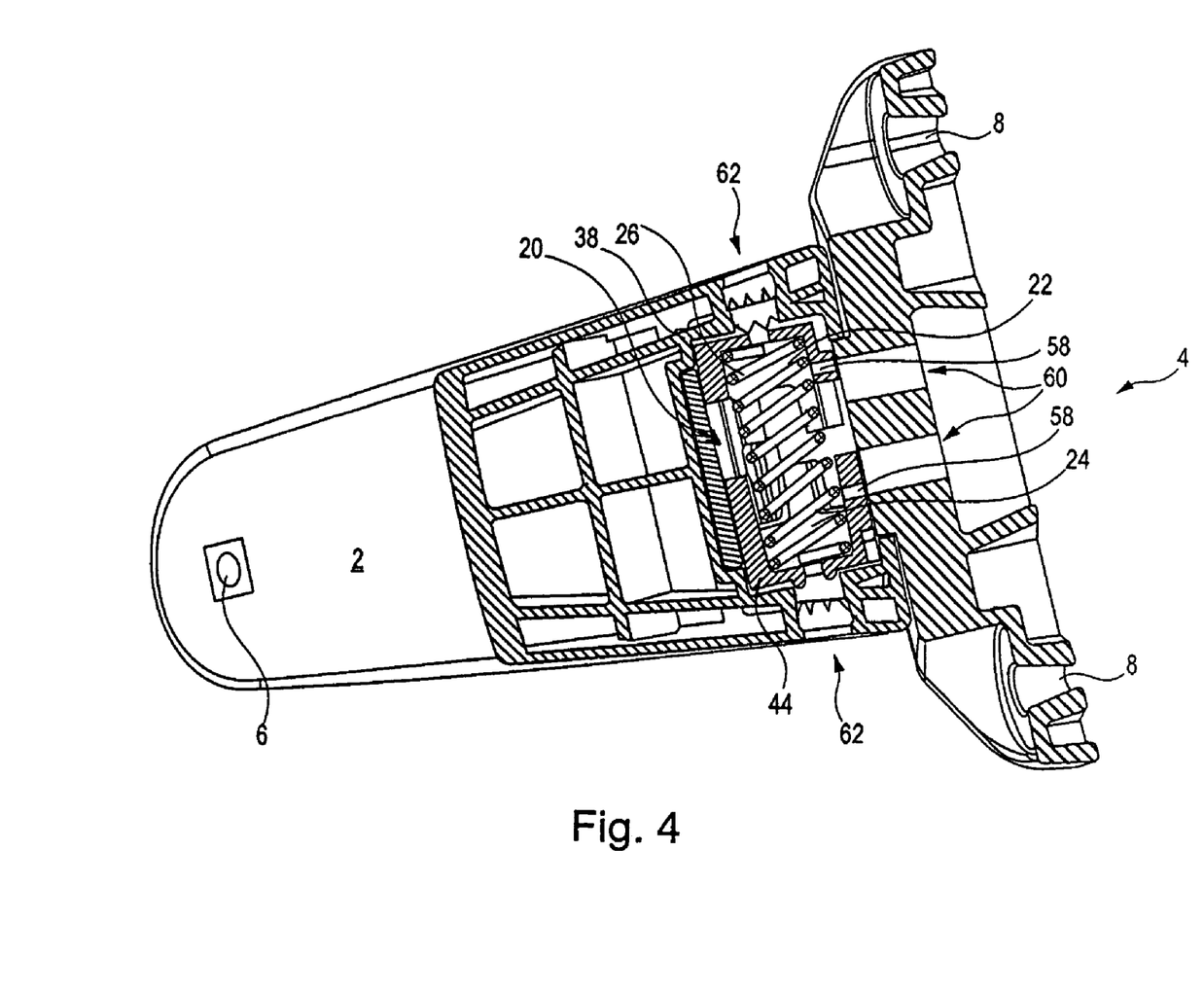
FIG. 4 is a sectional view along the plane A-A in FIG. 3.

As is particularly well depicted in FIGS. 2 and 5, the upper and the lower retainers 22, 24 exhibit in the direction of the retaining hinge axis 10, a circular cross-section. On inner ends of the retaining body side wall 48; finger shaped projections 50 project in the axial direction. These projecting fingers 50 (two above and two below) can be received as inserts into complementary recesses 52 in the body side wall 48. The inside diameters of the cap-like upper and lower retainers 22, 24 are so selected, that each diameter is somewhat larger than the outside diameter of the cylindrical compression spring 26. This allows the upper retainer 22 to overlay the upper end 28 of the spring and the lower retainer 24 to overlay the helical compression spring 26. The two said retainers, namely 22, 24, become fixed to one another in this way on the said helical spring 26. Consequently, in the fully mounted state of the equipment, the said helical spring 26 can exert force against the second contoured retaining surface 36, thereby pressing this against the first contoured retaining surface 34, and simultaneously, forces the third contoured retaining surface 40 against the fourth contoured retaining surface 42. The outside diameter of the two retainers 22, 24 in each case, is somewhat less than is the inside diameter of the casing 14, so that the hinge axlecomponent 20, together with the two said retainers 22, 24 can slide directly into the casing 14. Each of the two retainers 22, 24 possesses two longitudinally running, axially extending grooves 54, which are placed diametrically opposite one another on the circumference of the said retainers. These grooves 54 receive two corresponding axial projections 56 of the inside circumference of the casing 14. Grooves 54 form, in combination with the projections 56, a groove and spring connection. This groove and spring connection, fixes the rotational position of the two retainers 22, 24 in relation to the second retaining arm 4.

Figure 6:
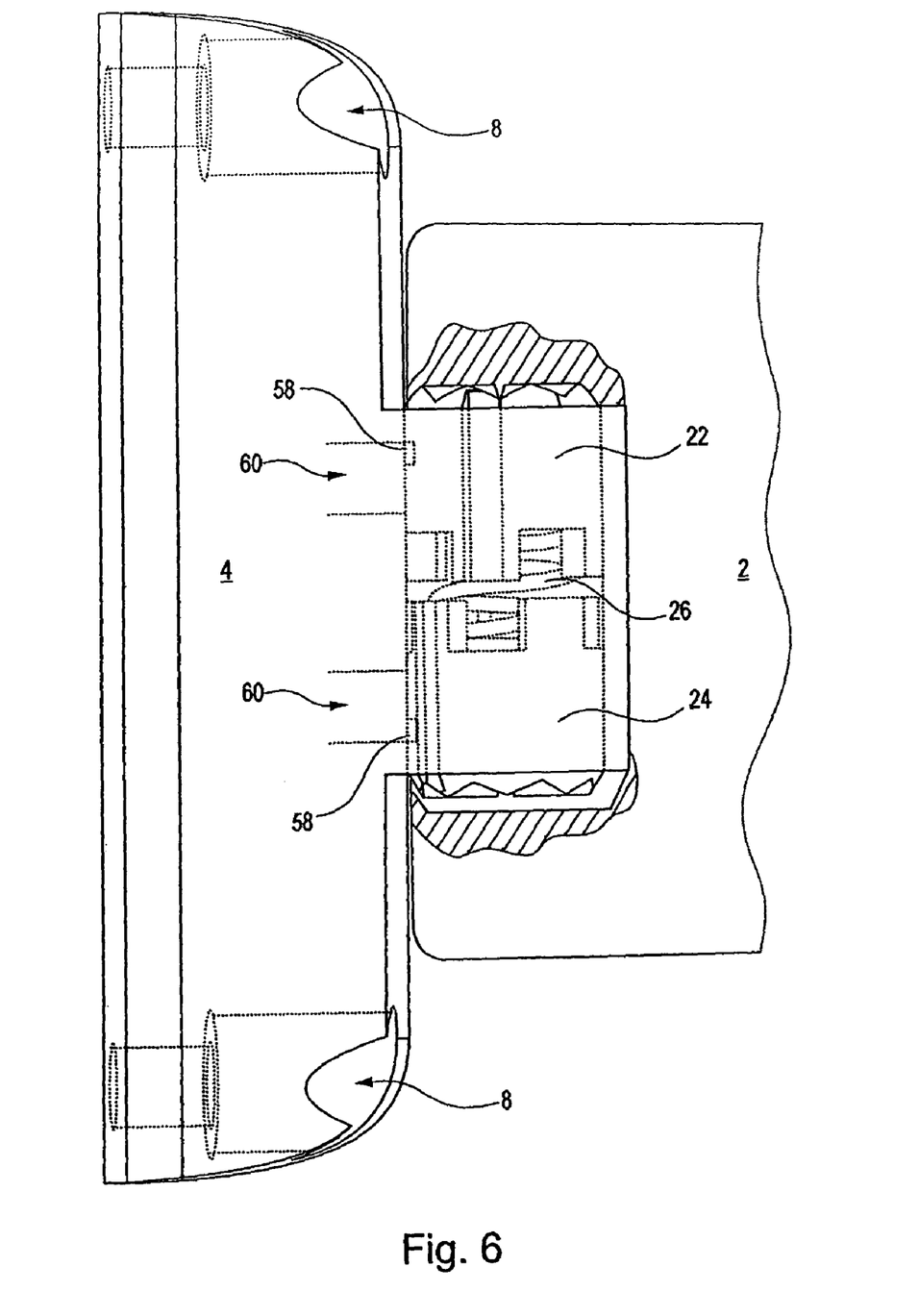
FIG. 6 is a side cutaway view of the assembled retaining hinge in which the retention elements are engaged in the bearing housing.
Figure 7:
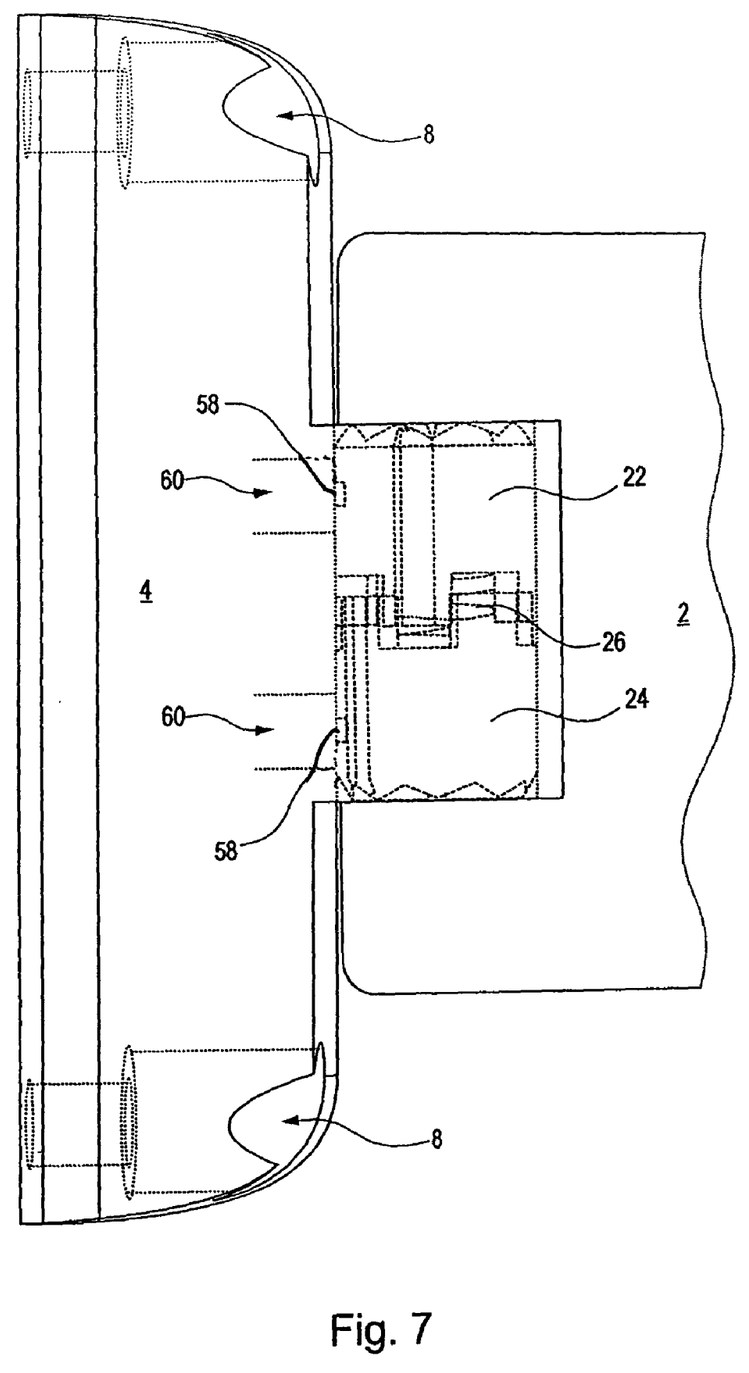
FIG. 7 is a side cutaway view of FIG. 6 wherein a tool combines two retention elements under pressure.

FIG. 6 shows the retaining hinge in its fully assembled state, with the two retainers 22, 24 engaged within the two bearing housings 30, 32 in such manner that the hinge axle component 20 binds together the two retaining arms 2 and 4. For the assembly and disassembly of the retaining hinge, it is necessary that the retainers 22, 24 be pressed together against the force of the helical spring 26. For this purpose, the two retainers 22, 24 possess oppositely situated access borings 58, as these may be seen in FIGS. 4 and 5. As is particularly made clear in FIG. 4, these two access borings 58, in the assembled condition, are located against two longitudinal openings 60, which are located in the second retaining arm 4 and more exactly, in casing 14 of bearing block 12. By means of a pincer-type tool, it is possible that a gripping access may be achieved from the vehicle side of the second retaining arm 4, through longitudinal openings 60 into access borings 58, and thereby, the retainers 22, 24 can be pressed together to overcome the compressive force of the helical spring 26, which then allows the hinge axle component 20 to release its engagement in the two bearing housings 30, 32. The arrangements for this operation are shown in the presentation of FIG. 7.

On the outside of the two bearing housings, namely 30 and 32, is respectively provided, in accord with the retaining hinge axis 10, a centrally located mounting opening 62. Opening 62 allows the invented retaining hinge to be additionally or alternatively assembled and disassembled. For this purpose, by means of a special tool, access may be gained through the mounted openings 62 and the upper and lower retainers 22, 24 can be pressed together against the compressive force of the helical spring 26, so that the two said retainers 22, 24 can respectively disengage themselves from the upper and lower bearing housings 30, 32.

While a preferred embodiment of the invention has been described using specific terms, such description is for illustrative purposes only, and it is to be understood that changes and variations may be made without departing from the spirit or scope of the following claims.

What is claimed is:

1. A retention hinge for positioning an outside mirror on a vehicle including:

a first retaining arm having an upper and a lower bearing housing, at least one of said bearing housings having a retention surface;

a second retaining arm including a bearing block comprising a casing having upper and lower openings, said bearing block being located between said upper and lower bearing housings;

a hinge axle comprising a retaining element passing through said bearing block and casing along a pivot axis and engaging in said upper and lower bearing housings securing together and pivotally linking said first and second retaining arms together in relative fixed positions;

said retaining element comprising axially movable and longitudinally spaced first and second retainers, with at least one of said spaced retainers having a retention surface on an outer end face adapted to engage with said retention surface of said at least one bearing housing; wherein said first spaced retainer includes a series of circumferentially arranged and spaced projections extending longitudinally along said pivot axis from an inner end surface opposite said retention surface with a series of recesses defined between said projections, and said second spaced retainer having a complementary arrangement of spaced projections and recesses extending longitudinally along said pivot axis toward said first spaced retainer within said casing; wherein said projections from said first spaced retainer are received into said recesses of said second spaced retainer and said projections from said second retainer are received into said recesses of said first retainer when said spaced first and second retainers are moved axially toward each other;

a spring member located between said longitudinally spaced first and second retainers, said spring urging said longitudinally spaced retainers outwardly along said pivot axis positioning said retention surface of said at least one spaced retainer and said bearing housing in engagement locking said first and second retaining arms against rotation.

2. A retention hinge according to claim 1, wherein said spring comprises a compression spring.

3. A retention hinge according to claim 1, wherein the hinge axle extends in a radial direction.

4. A retention hinge according to claim 1, wherein at least one of said first and second spaced retainers projects partially out of said casing for engaging one of said upper and lower bearing housings.

5. A retention hinge according to claim 1 wherein each of said upper and lower bearing housings have a retention surface and each of said first and second spaced retainers have a retention surface, said retention surface of said upper bearing housing engaging with said retention surface of said first spaced retainer and said retention surface of said lower bearing housing engaging with said retention surface of said second spaced retainer.

6. A retention hinge according to claim 1, wherein said upper and lower bearing housings are concave in shape with openings thereof facing one another, said openings each have a bottom surface upon which said retention surface of said upper and lower bearing housings are constructed.

7. A retention hinge for positioning an outside mirror on a vehicle comprising:
 a first retaining arm for supporting a mirror including an upper bearing housing and a lower bearing housing laterally spaced;
 a second retaining arm for securing with said vehicle including a bearing block defining a casing having an upper opening and a lower opening;
 a hinge axle arranged along an axis of rotation and generally disposed within said casing which engages said upper and lower bearing housings to control rotation of said first retaining arm in relation to said second retaining arm, wherein said hinge axle comprises a pair of laterally spaced retainers mounted in said casing to move longitudinally along said axis of rotation and each having a contoured retention surface on an outer end face that comprises a series of grooves and ridges;
 a pair of axially extending grooves placed generally opposite each other on the circumference of each of said spaced retainers and running along the entire length of said spaced retainers, and a corresponding pair of axially extending projections disposed along an inside circumference of said casing running along the entire length of said casing, wherein said axially extending projections of said casing engage said axially extending grooves of said spaced retainers to fix the position of said spaced retainers within said casing and resist rotation within said casing;
 said upper and lower bearing housings each having a complementary contoured retention surface configured to mate with said contoured retention surface on said outer end face on one of said spaced retainers;
 a spring carried between said spaced retainers adapted to urge said spaced retainers axially outward forcing said retention surface on each of said spaced retainers into mating engagement with said contoured retention surface on said upper bearing housing and said lower bearing housing; whereby
 said first retaining arm is adjusted between plural positions relative to said second retaining arm by applying rotational pressure against said first retaining arm causing said grooves and ridges of each said contoured retention surface to force said spaced retainers to move axially in said casing by compressing said spring and allowing said first retaining arm to move about said axis of rotation to be re-positioned relative to said second retaining arm.

8. A retention hinge according to claim 7, wherein said spring comprises one of a helical compression spring and a packet of bundled plate springs.

9. A retention hinge according to claim 7, wherein said bearing block includes longitudinal openings extending through said casing generally perpendicular to said hinge axle for providing access to said spaced retainers during assembly and disassembly of said first and second arm.

10. A retention hinge according to claim 7, wherein the upper bearing housing includes an upper opening and the lower bearing housing includes a lower opening for access to said spaced retainers during assembly and disassembly of said first and second arm.

11. A retention hinge according to claim 9, wherein each of said spaced retainers includes an access boring, and said axially extending grooves on said circumference of said spaced retainers cooperates with said axially extending projections on said inside circumference of said casing to index said access boring in each of said spaced retainers to align with said longitudinal openings in said bearing block so that gripping access is provided to said spaced retainers.

* * * * *